United States Patent
Salajegheh et al.

(10) Patent No.: US 9,984,231 B2
(45) Date of Patent: May 29, 2018

(54) DETECTING PROGRAM EVASION OF VIRTUAL MACHINES OR EMULATORS

(71) Applicant: QUALCOMM Incorporated, San Diego, CA (US)

(72) Inventors: Mastooreh Salajegheh, Santa Clara, CA (US); Rajarshi Gupta, Sunnyvale, CA (US); Nayeem Islam, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 14/937,949

(22) Filed: Nov. 11, 2015

(65) Prior Publication Data

US 2017/0132411 A1    May 11, 2017

(51) Int. Cl.
*G06F 21/53* (2013.01)
*G06F 21/56* (2013.01)

(52) U.S. Cl.
CPC ............ *G06F 21/53* (2013.01); *G06F 21/566* (2013.01); *G06F 2221/2105* (2013.01)

(58) Field of Classification Search
CPC .......... G06F 21/00; G06F 21/50; G06F 21/52; G06F 21/53; G06F 21/55; G06F 21/554; G06F 21/56; G06F 21/566; G06F 2221/2149
See application file for complete search history.

(56) References Cited

U.S. PATENT DOCUMENTS

| | | | | |
|---|---|---|---|---|
| 6,697,971 B1 * | 2/2004 | Dwyer | ................... | G06F 9/3824 |
| | | | | 711/E12.101 |
| 8,763,125 B1 * | 6/2014 | Feng | ....................... | G06F 21/56 |
| | | | | 713/175 |
| 8,904,537 B2 | 12/2014 | Turkulainen et al. | | |
| 9,104,870 B1 * | 8/2015 | Qu | ......................... | G06F 21/563 |
| 9,294,486 B1 * | 3/2016 | Chiang | .................. | H04L 63/14 |
| 9,355,246 B1 * | 5/2016 | Wan | ....................... | G06F 21/566 |
| 9,411,959 B2 * | 8/2016 | Adams | .................... | G06F 21/56 |
| 9,413,774 B1 * | 8/2016 | Liu | ....................... | H04L 63/1416 |
| 9,501,644 B2 * | 11/2016 | Niemela | ................ | G06F 21/566 |
| 9,703,956 B1 * | 7/2017 | Watson | .................. | G06F 21/562 |

(Continued)

FOREIGN PATENT DOCUMENTS

WO    2013067505 A1    5/2013

OTHER PUBLICATIONS

Kang et al. "Emulating Emulation-Resistant Malware" [Online], Nov. 9, 2009 [Retrieved on: Apr. 10, 2017], Retrieved from: http://bitblaze.cs.berkeley.edu/papers/VMSec02-kang.pdf.*

(Continued)

*Primary Examiner* — Eric W Shepperd
(74) *Attorney, Agent, or Firm* — Jae-Hee Choi; The Marbury Law Group

(57) ABSTRACT

Various embodiments include methods implemented on a computing device for analyzing a program executing within a virtual environment on the computing device. The methods may include determining whether the program is attempting to detect whether it is being executed within the virtual environment, and analyzing the program within a protected mode of the computing device in response to determining that the program is attempting to detect whether it is being executed within the virtual environment.

24 Claims, 6 Drawing Sheets

(56) References Cited

U.S. PATENT DOCUMENTS

| | | | | |
|---|---|---|---|---|
| 2011/0225655 | A1* | 9/2011 | Niemela | G06F 21/566 726/24 |
| 2013/0104234 | A1* | 4/2013 | Northup | G06F 21/52 726/24 |
| 2014/0096250 | A1* | 4/2014 | Belov | G06F 21/566 726/23 |
| 2015/0067862 | A1* | 3/2015 | Yu | H04L 63/145 726/24 |
| 2015/0150131 | A1* | 5/2015 | Boutnaru | G06F 21/567 726/23 |
| 2015/0161381 | A1 | 6/2015 | Sun et al. | |
| 2015/0372980 | A1* | 12/2015 | Eyada | H04L 63/1441 726/1 |
| 2016/0080414 | A1* | 3/2016 | Kolton | H04L 63/1491 726/23 |
| 2016/0212154 | A1* | 7/2016 | Bobritsky | G06F 21/56 |
| 2016/0357965 | A1* | 12/2016 | Prowell | G06F 21/566 |
| 2016/0381042 | A1* | 12/2016 | Zhang | G06N 99/005 726/24 |
| 2017/0243000 | A1* | 8/2017 | Shraim | G06F 21/53 |

OTHER PUBLICATIONS

Ferrie, Peter, "Attacks on Virtual Machine Emulators" [Online], 2006, [Retrieved on: Apr. 10, 2017], In: AVAR Conference, Auckland, Symantec Advanced Threat Research (2006), Retrieved from: < http://isis.poly.edu/~aleksey/papers/Virtual_Machine_Threats.pdf >.*

Iindorfer et al. "Detecting Environment-Sensitive Malware" [Online], Secure Systems Lab, Vienna University of Technology, 2011 [Retrieved on: Jan. 30, 2018], Retrieved from: < http://seclab.tuwien.ac.at/papers/disarm_paper.pdf > (Year: 2011).*

Raffetseder et al. "Detecting System Emulators" [Online], Secure Systems Lab, Vienna University of Technology, 2007 [Retrieved on: Jan. 30, 2018], Retrieved from: < file:///C:/Users/eshepperd/Documents/e-red%20Folder/14937949/isc07_detection.pdf > (Year: 2007).*

Sun et al. "Malware Virtualization-Resistant Behavior Detection" [Online], 2011 [Retrieved on: Jan. 30, 2018], IEEE 17th International Conference on Parallel and Distributed Systems, Retrieved from: < http://ieeexplore.ieee.org/stamp/stamp.jsp?arnumber=6121379 > (Year: 2011).*

Lindorfer M., "Detecting Environment-Sensitive Malware," Matriculation No. 0626770, at the Faculty of Informatics, Vienna University of Technology, Vienna, Apr. 11, 2011, 62 Pages.

Petsas T., et al., "Rage against the Virtual Machine: Hindering Dynamic Analysis of Android Malware," Proceedings of the Seventh European Workshop on System Security, 2014, pp. 1-6.

Wueest C., "Threats to Virtual Environments," Symantec, Security Response, Version 1.0—Aug. 12, 2014, 18 pages.

Balzarotti D., et al., "Efficient Detection of Split Personalities in Malware", May 1, 2015 (May 1, 2015), XP055324245, Retrieved from the Internet: URL:https://web.archive.org/web/20150501000000/http://www.isoc.org/isoc/conferences/ndss/10/pdf/24.pdf [retrieved on Nov. 29, 2016]. Whole document—16 pages.

International Search Report and Written Opinion—PCT/US2016/056443—ISA/EPO—dated Dec. 8, 2016.

Kirat D., et al., "Open access to the Proceedings of the 23rd USENIX Security Symposium is sponsored by US EN IX BareCioud: Baremetal Analysis-based Evasive Malware Detection BareCioud: Bare-metal Analysis-based Evasive Malware Detection", LISA 17, Berkeley, CA, USA, Aug. 20, 2014, pp. 287-301, XP055324257, ISBN: 978-1-931971-15-7 Retrieved from the Internet: URL:https://www.usenix.org/system/files/conference/usenixsecurity14/sec14-paper-kirat.pdf retrieved on Nov. 29, 2016].

* cited by examiner

DETECTING PROGRAM EVASION OF VIRTUAL MACHINES OR EMULATORS

BACKGROUND

Various computing devices, including desktop computers, laptops, tablets, and mobile computing devices such as smart phones, execute programs and processes according to software instructions stored in memory. Some programs, such as malware, execute malicious code when run on a computing device. There are a various ways to detect and analyze programs to determine whether or not those programs are malicious.

One method of analyzing programs is to execute the program within a virtual environment on the computing device, such as a virtual machine or emulator. The virtual environment provides an artificial self-contained environment for the program to execute. An anti-malware application or other program analyzer may observe and analyze the behavior of the program within the virtual environment to determine whether or not it is malicious.

However, some malicious programs may try to evade virtual environment testing by attempting to detect whether the program is executing within a virtual environment. For example, the program may attempt to call certain functions or access certain data structures indicative of a virtual operating environment. If the program detects that it is executing within a virtual environment, the program may behave in a benign manner and thus escape detection. When the program is released and executed within the normal operating system of a computing device, the program may then act maliciously.

SUMMARY

Various embodiments include methods implemented on a computing device for analyzing a program executing within a virtual environment on the computing device. The methods of the various embodiments may include determining whether the program is attempting to detect whether the program is being executed within the virtual environment. In response to determining that the program is attempting to detect whether the program is being executed within the virtual environment, the program may be analyzed within a protected mode of the computing device.

In some embodiments, the protected mode may be a system management mode. Some embodiments may further include continuing analysis of the program within the virtual environment in response to determining that the program is not attempting to detect whether the program is being executed within the virtual environment.

In some embodiments, determining whether the program is attempting to detect whether the program is being executed within the virtual environment may include monitoring access of the program to application programming interface (API) properties of the virtual environment. In some embodiments, the API properties may include at least one member selected from the group consisting of a model specific register, a length of an instruction, a store interrupt descriptor table register, a debugger function, and an instruction for host-guest communication. In some embodiments, the virtual environment may be a virtual machine or an emulator.

Further embodiments include a computing device including a memory and a processor configured with processor-executable instructions to perform operations of the methods described herein. Further embodiments include a non-transitory processor-readable storage medium having stored thereon processor-executable software instructions configured to cause a processor to perform operations of the methods described herein. Further embodiments include a computing device that includes means for performing functions of the operations of the methods described herein.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the claims.

DETAILED DESCRIPTION

Figure 1:
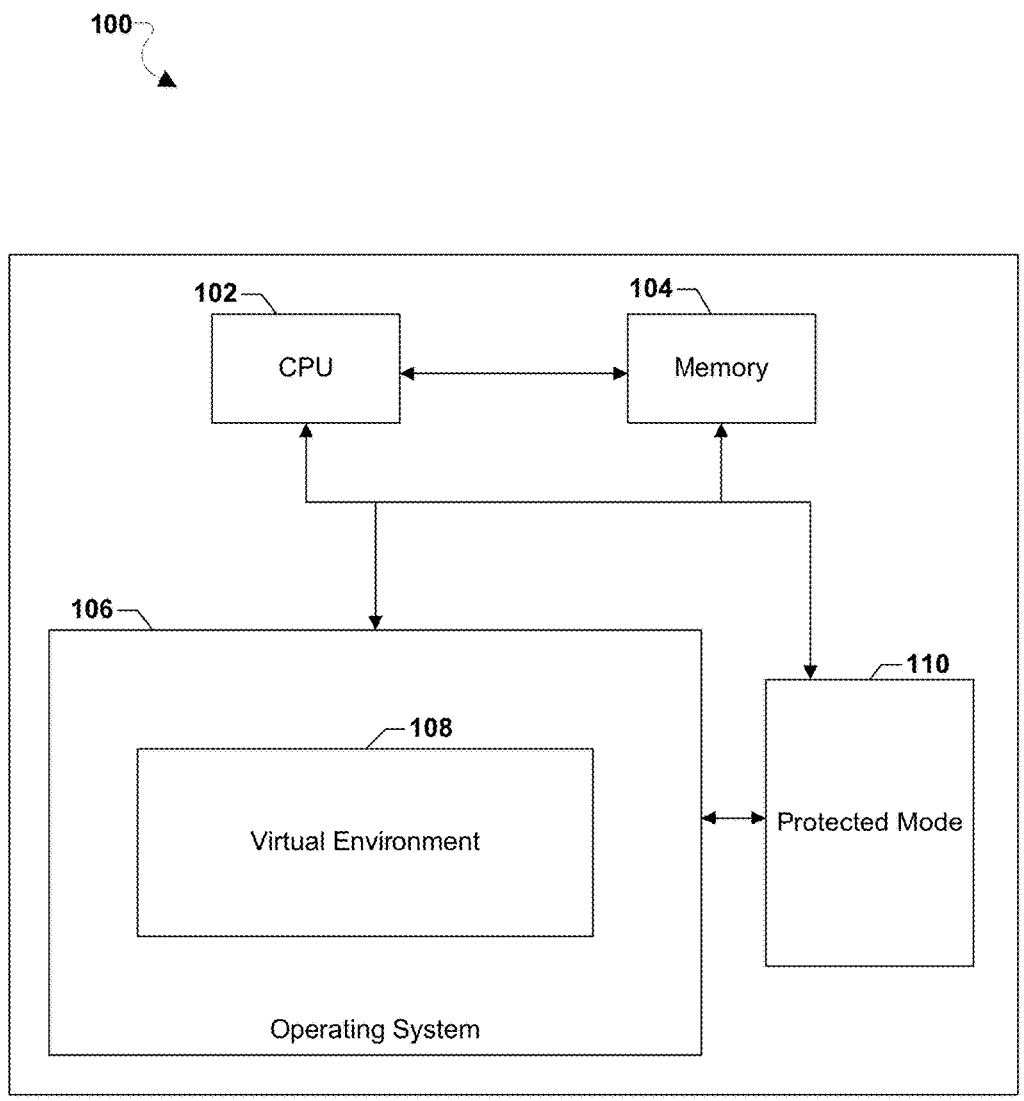
FIG. 1 is a block diagram of a computing device for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the term "computing device" refers to any one or all of cellular telephones, smart phones, personal or mobile multi-media players, personal data assistants, desktop computers, laptop computers, tablet computers, servers, smart watches, smart books, palm-top computers, wireless electronic mail receivers, multimedia Internet-enabled cellular telephones, wireless gaming controllers, and similar personal or enterprise electronic devices that includes a programmable processor and memory.

Computing devices execute programs and applications that provide a number of functions and services for users. A threat to computing devices and the services provided to users is malware, which refers to a variety of programs written to perform unauthorized operations that in many cases are malicious. For example, malware that executes on a computing device may be designed to take control of the computing device, delete or corrupt critical files on the computing device, spy or track user actions on the computing device, provide unwanted advertisements to users, or extort or trick users into paying money or giving away financial or personal information. Thus, methods of detecting and protecting against malware have received much attention.

There are a number of ways to detect malicious programs. One method is to execute a potentially malicious program within a virtual environment on the computing device, such as a virtual machine or emulator. The virtual environment may provide a self-contained environment that resembles the normal operating system of a computing device. Program operations may be analyzed within the virtual environment to determine whether it exhibits malicious behaviors. However, there is a risk that some malware programs vary their behavior depending on whether they are being executed within a virtual environment. These programs may behave benignly in a virtual environment but behave maliciously in a normal operating system environment.

In overview, various embodiments provide systems and methods for analyzing a program executing within a virtual environment on a computing device. Various embodiments may include determining whether the program is executing operations that indicated the program is attempting to detect whether it is being executed within the virtual environment. In response to determining that the program is attempting to detect whether it is being executed within the virtual environment, the program may be analyzed within a protected mode of the computing device. In response to determining that the program is not attempting to detect whether it is being executed within the virtual environment in, the analysis of the program may continue within the virtual environment. The virtual environment may be a virtual machine or an emulator. The protected mode may be a system management mode on the computing device or another computing device that is isolated from other network components and/or sensitive information.

Methods for recognizing when the program is attempting to detect whether it is being executed within the virtual environment may include monitoring access of the program to application programming interface (API) properties of the virtual environment. The API properties being monitored may include at least one of a model specific register, a length of an instruction, a store interrupt descriptor table register, a debugger function, and instructions for host-guest communication (e.g., IN/OUT instructions for accessing data from an input/output port, and use of illegal opcodes within a virtual environment).

FIG. 1 is a functional block diagram of a computing device 100 suitable for implementing various embodiments. The computing device 100 may be, among other things, a desktop computer, laptop, tablet, any type of mobile electronic device, a server or any type of consumer or enterprise electronic device. The computing device 100 includes a central processing unit (CPU) 102 for executing software instructions, and a memory 104 for storing code and data. The memory 104 may be a non-transitory computer-readable storage medium that stores processor-executable instructions. The memory 104 may store an operating system 106.

A virtual environment 108 may be created and executed within the operating system 106. The virtual environment 108 may be a virtual machine or emulator—that is, the virtual environment 108 may be used to simulate the software and/or hardware environment and functionality of another computing system. The virtual environment 108 may be based on the computer architecture, hardware, and/or software of the computing system that the virtual environment 108 is trying to simulate. The virtual environment 108 may be used for a number of different purposes. One use of the virtual environment 108 may be as a testing ground or artificial environment to analyze the behavior of potentially malicious programs.

The computing device 100 may also include a protected mode 110. The protected mode 110 may be a special mode of the computing device 100 that when activated suspends the operation of the operating system 106 or otherwise insulates the computing device from malicious actions by malware. The protected mode 110 may be a particular operating mode of the CPU 102 that has special privileges with respect to hardware and software functions on the computing device 100. The protected mode 110 may be implemented within firmware or a hardware-assisted debugger on the computing device 100. An example of the protected mode 110 is a system management mode (SMM), which may be provided in certain CPU chipsets. The SMM may be triggered by asserting the system management interrupt (SMI) pin on the CPU 102. The handler for the SMM may be stored in special memory accessible only by the SMM.

The protected mode 110 may be used for performing special tasks such as power management or error handling. The protected mode 110 is a "real" computing environment in that it runs within the actual hardware on the computing device 100 rather than simulated hardware as in the virtual environment 108. The protected mode 110 may also provide certain safeguards against malicious code, such as locking out programs from high level access (e.g., root access). Thus, in various embodiments the protected mode 110 may serve as an alternate testing environment for potentially malicious programs, especially if the programs are designed to evade the virtual environment 108.

The computing device 100 may also include various other components not illustrated in FIG. 1. For example, the computing device 100 may include a number of input, output, and processing components such as a speaker, microphone, modem, transceiver, subscriber identification module (SIM) card, keypad, mouse, display screen or touchscreen, various connection ports, audio or graphics processor, additional hard drives, and many other components known in the art.

Figure 2:
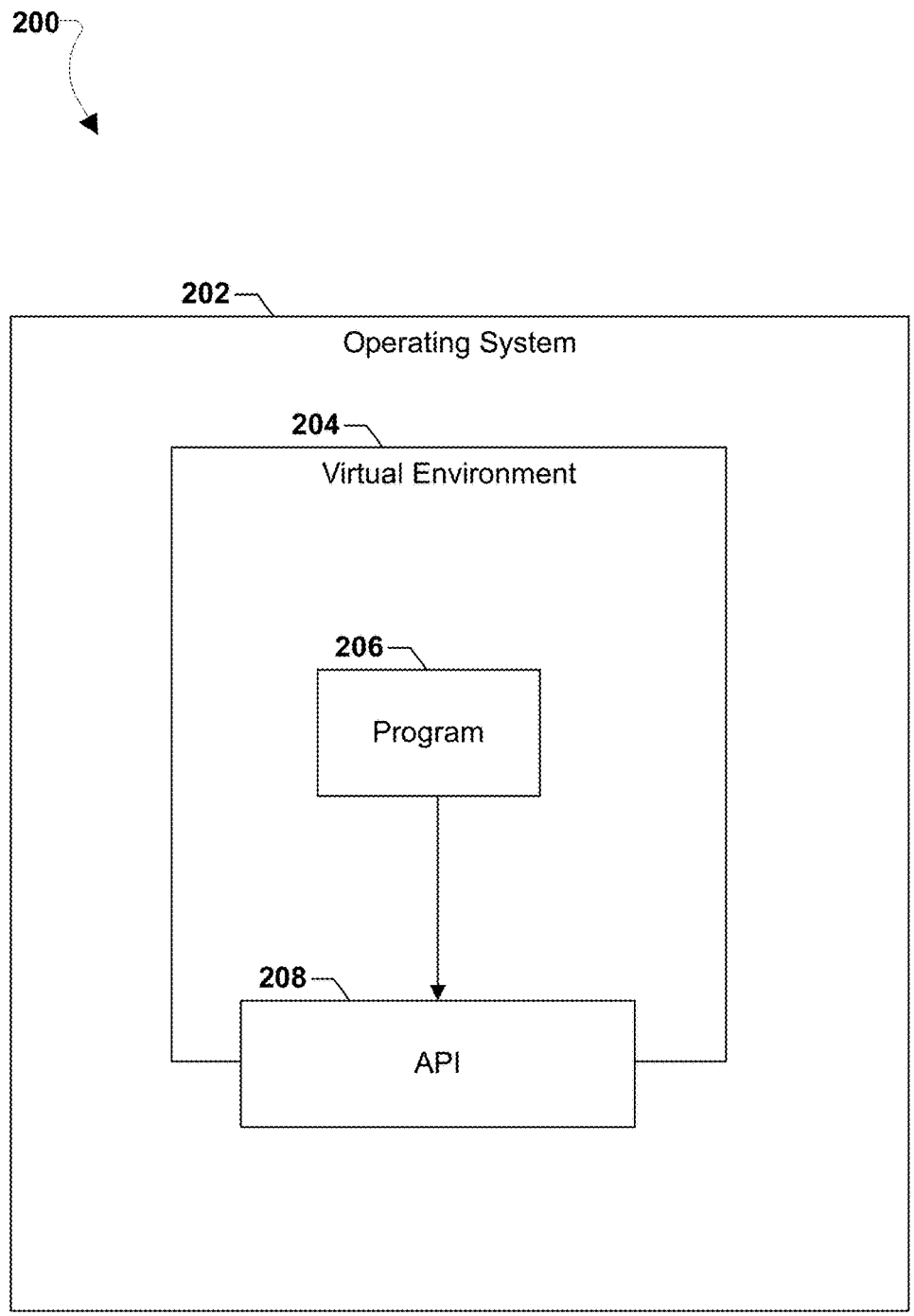
FIG. 2 is a block diagram illustrating program analysis within a virtual environment on a computing device according to various embodiments.

FIG. 2 includes a block diagram 200 illustrating program analyses using a virtual environment on a computing device. The computing device may include an operating system 202. A virtual environment 204 may run within the operating system 202. The virtual environment 204 may provide a self-contained computing environment within the operating system 202. For example, the virtual environment 204 may be a virtual machine or emulator that simulates the software and/or hardware functionality of another computing system. The virtual environment 204 may be used to analyze a program 206 to determine whether or not it is malicious. A program 206 executed within the virtual environment 204 is not able to access the operating system 202 or other resources of the computing device outside of the virtual environment. Thus, if the program 206 is malicious, the program 206 is not capable of coopting or damaging the operating system 202 or the computing device on which the virtual environment 204 executes.

The virtual environment 204 may include an application programming interface (API) 208 that is used by the operating system 202 to interact with and control the virtual environment 204. The API 208 may include a number of functions, routines, protocols, and data structures.

Some malicious programs (e.g., program 206) may be designed to attempt to discover whether they are executing within a virtual machine, or within an operating system. Such programs may behave benignly when executing within the virtual environment 204 and thus may evade malicious code detection. Once the programs are released into the operating system 202, the programs may begin acting maliciously.

The malicious program 206 may attempt to discover whether it is executing within a virtual environment 204, such as by attempting to call certain functions or access certain data structures in the API 208. Certain return values from the called functions or data structures of the API 208 may confirm that the program 206 is executing within the virtual environment 204. Therefore in various embodiments, the virtual environment 204 or the operating system 202 may be configured to monitor operations and behaviors of the program 206 within the virtual environment 204 to determine whether the program 206 is calling certain functions or accessing certain data structures in the API 208 in an attempt to discover whether it is executing within the virtual environment 204. There are several types of functions and/or data structures that a malicious program 206 might execute or attempt to access in an effort to detect a virtual environment, and that the virtual environment 204 may be configured to detect.

A non-limiting example of an action that a malicious program 206 might perform and that the virtual environment 204 may be configured to detect includes accessing a model specific register that is valid on a quick emulator (QEMU) simulator but returns an exception when called in the actual computing device.

Another non-limiting example of an action that a malicious program 206 might perform and that the virtual environment 204 may be configured to detect includes accessing a length of an instruction. This is because the length of an instruction will be finite in an actual computing device but may be arbitrarily long in a virtual environment.

Another non-limiting example of an action that a malicious program 206 might perform and that the virtual environment 204 may be configured to detect includes accessing a store interrupt descriptor table register. This is because the base address in a virtual environment may differ from an actual computing device, and may exceed a certain function.

Another non-limiting example of an action that a malicious program 206 might perform and that the virtual environment 204 may be configured to detect includes calling a debugger function. For example, the environment 204 may be configured to detect when a program calls IsDebuggerPresent( ) or CheckRemoteDebuggerPresent( ).

Another non-limiting example of an action that a malicious program 206 might perform and that the virtual environment 204 may be configured to detect includes executing an IN or OUT instruction used to read or write data from an input/output port used during host-guest communications. Such an IN or OUT instruction may involve reading/writing data from port addresses that exist within a virtual environment but that would raise an exception when called in the underlying computing device.

Another non-limiting example of an action that a malicious program 206 might perform and that the virtual environment 204 may be configured to detect includes an attempt to execute illegal opcodes during host-guest communication. This is because an error handler of the underlying computing device may handle a call to an illegal opcode but the virtual environment may not have an error handler. For example, an illegal opcode may include an undefined opcode or an illegal coding of an existing opcode. Which opcodes are illegal may depend on the particular virtual environment 204 and/or hardware or software of the computing device.

If the virtual environment 204 detects that the program is attempting to detect whether it is executing within the virtual environment 204 (i.e., the program is trying to evade testing in a virtual environment), the virtual environment 204 may mark or flag the program 206 as an evading program and terminate the program 206. The virtual environment 204 or the operating system 202 may then signal the computing device that the program 206 should be executed and analyzed within a protected mode on the computing device. This is illustrated in FIG. 3.

Figure 3:
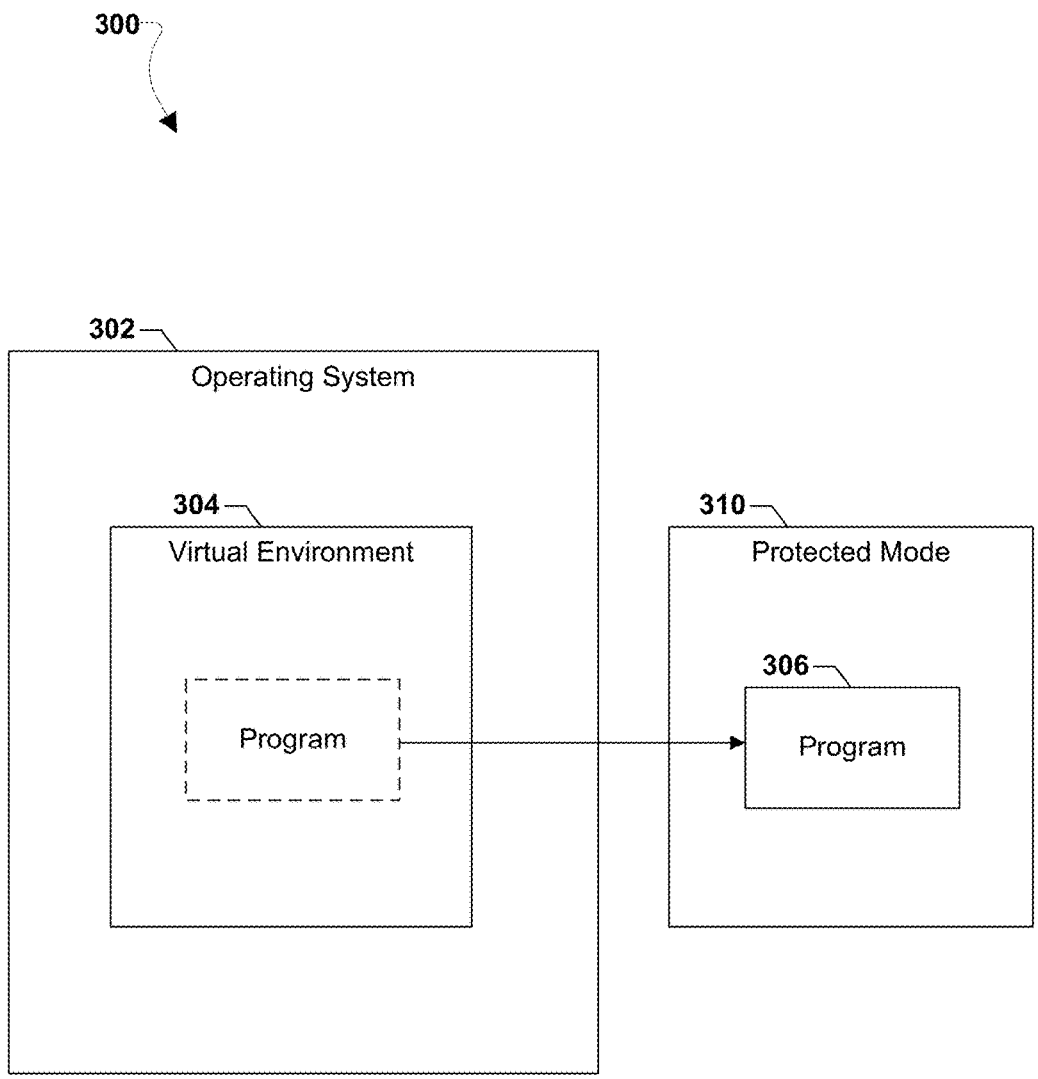
FIG. 3 is a block diagram illustrating program analysis within a protected mode on a computing device according to various embodiments.

FIG. 3 is a block diagram 300 illustrating program analysis using a protected mode on a computing device. The computing device may include an operating system 302. A virtual environment 304 may operate within the operating system 302 to analyze potentially malicious programs, such as the program 306. The virtual environment 304 may detect that the program 306 is attempting to detect whether it is being executed within the virtual environment 304 as described with reference to FIG. 2. The virtual environment 304 may flag the program 306 as evading and terminate the program 306. The computing device may then initiate a protected mode 310, such as SMM. The protected mode 310 may be triggered by a system interrupt, such as the SMI for a SMM. The program 306 may be re-executed within the protected mode 310.

The protected mode 310 may also provide a self-contained environment for analyzing the program 306, but is an environment that is based on the actual computing device rather than a simulation of another computing device. Thus, the program 306, which may be designed to evade the virtual environment 304, will not detect that it is executing in a virtual environment and thus will not behave in a manner designed to evade the protected mode 310 (i.e., the program 306 behaves normally rather than pretending to be benign). The protected mode 310 may prevent the program 306 from accessing critical parts of the computing device, for example preventing root access. An anti-malware application or another program analyzer may analyze the program 306 within the protected mode 310 to determine whether or not it is malicious. The protected mode 310 may utilize more computing resources than the virtual environment 304, so in some embodiments only programs that evade the virtual environment 304 may be analyzed within the protected mode 310.

Figure 4:
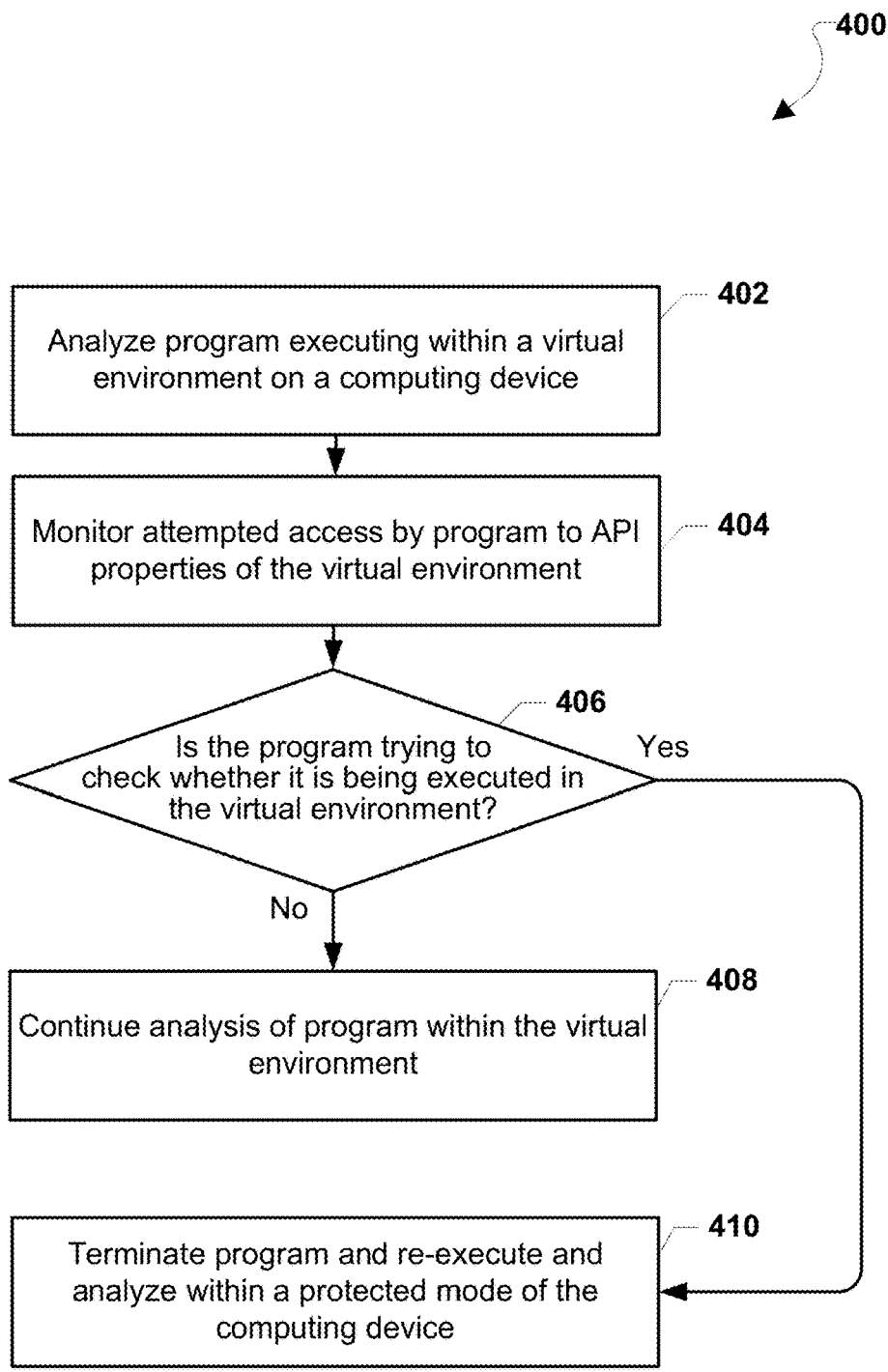
FIG. 4 is a process flow diagram illustrating a method for analyzing a program on a computing device according to various embodiments.

FIG. 4 illustrates a method 400 for analyzing a program executing within a virtual environment on a computing device according to various embodiments. With reference to FIGS. 1-4, the method 400 may be implemented with a processor (e.g., the CPU 102 and/or the like) of a computing device (such as the computing device 100) that is capable of running a virtual environment (e.g., a virtual machine or emulator) and a protected mode (e.g., SMM).

In block 402, the processor may analyze a program executing within a virtual environment on the computing device. The program may be potential malware or any other unknown program, and the processor may be analyzing the program to determine whether or not it is malicious. The virtual environment may be a virtual machine or emulator that simulates the software and/or hardware environment of another computing system. The virtual environment may include an API that is used by the computing device to control and interact with the virtual environment.

In block 404, the processor may monitor attempted accesses by the program to certain APIs and data structures that could reveal properties of the virtual environment. Attempts by the program to access such API and/or data structure properties may indicate that the program is attempting to detect whether the program is being executed within a virtual environment. A non-limiting example of an API property that may be monitored in block 404 is a model specific register (which is valid on a quick emulator (QEMU) simulator but returns an exception when called in the actual computing device). Another non-limiting example of an API property that may be monitored in block 404 is a length of an instruction (which may be arbitrarily long in a virtual environment). Another non-limiting example of an API property that may be monitored in block 404 is a store interrupt descriptor table register (the base address may be different in a virtual environment and may also exceed a certain function). Another non-limiting example of an API property that may be monitored in block 404 is a debugger function (e.g., IsDebuggerPresent( ) or CheckRemoteDebuggerPresent( ). Another non-limiting example of an API property that may be monitored in block 404 is an IN/OUT instruction used for host-guest communication. Another non-limiting example of an API property that may be monitored in block 404 is illegal opcode handling used for host-guest communication.

In determination block 406, the processor may determine from the monitored behaviors whether the program is attempting to discover whether it is being executed within the virtual environment. For example, the processor may determine that the program is attempting to access the monitored API that could reveal properties unique to virtual environments.

In response to determining that the program is not attempting to detect whether it is being executed within the virtual environment (i.e., determination block 406="No"), the processor may continue analysis of the program within the virtual environment in block 408. That is, if the program is not trying to evade virtual environment testing, the processor may continue analyzing the program in the virtual environment.

In response to determining that the program is attempting to detect whether it is being executed within the virtual environment (i.e., determination block 406="Yes"), the processor may terminate the program, and re-execute and analyze the program within a protected mode on the computing device in block 410. For example, the processor may flag or otherwise identify that the program has evading and trigger the protected mode. The protected mode may be the SMM on the computing device, which may be triggered using a SMI. The protected mode may allow continued analysis of the program in an environment based on the actual computing device rather than a simulation of another computing system, but that still prevents the program from accessing and damaging critical parts of the computing device. In this manner, the method 400 provides a way to analyze potentially malicious programs that evade virtual environment testing.

Figure 5:
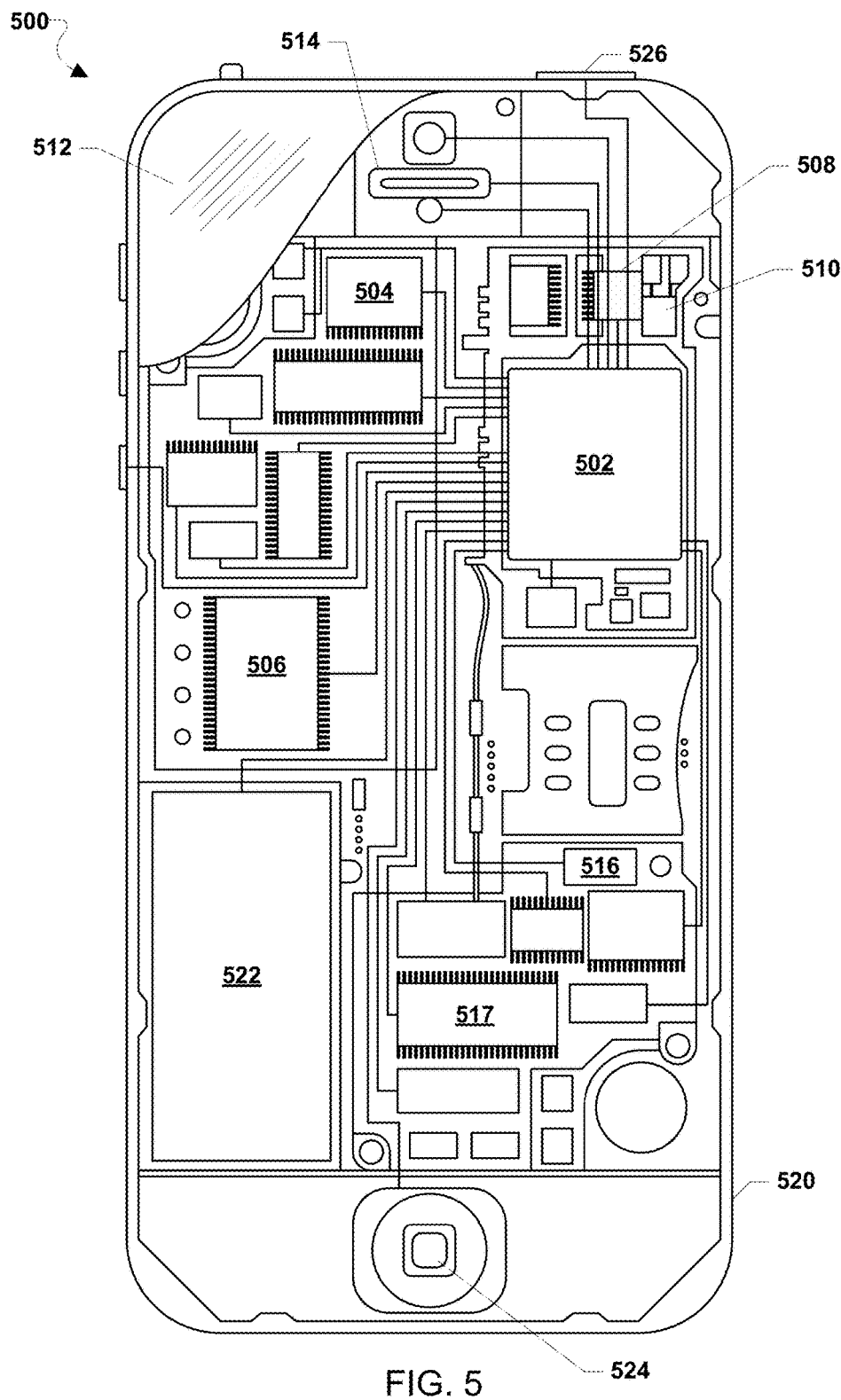
FIG. 5 is a component block diagram of a mobile computing device suitable for implementing some embodiment methods.

Various embodiments, including the embodiments illustrated in FIG. 4, may be implemented in any of a variety of computing devices, an example of which (e.g., computing device 500) is illustrated in FIG. 5. According to various embodiments, the computing device 500 may be similar to the computing device 100 as described with reference to FIG. 1. As such, the computing device 500 may implement the method 400 in FIG. 4.

The computing device 500 may include a processor 502 coupled to a touchscreen controller 504 and an internal memory 506. The processor 502 may be one or more multi-core integrated circuits designated for general or specific processing tasks. The internal memory 506 may be volatile or non-volatile memory, and may also be secure and/or encrypted memory, or unsecure and/or unencrypted memory, or any combination thereof. The touchscreen controller 504 and the processor 502 may also be coupled to a touchscreen panel 512, such as a resistive-sensing touchscreen, capacitive-sensing touchscreen, infrared sensing touchscreen, etc. Additionally, the display of the computing device 500 need not have touch screen capability.

The computing device 500 may have a cellular network transceiver 508 coupled to the processor 502 and to an antenna 510 and configured for sending and receiving cellular communications. The transceiver 508 and the antenna 510 may be used with the above-mentioned circuitry to implement various embodiment methods. The computing device 500 may include one or more SIM cards 516 coupled to the transceiver 508 and/or the processor 502 and may be configured as described herein. The computing device 500 may include a cellular network wireless modem chip 517 that enables the processor to communication via a cellular network.

The computing device 500 may also include speakers 514 for providing audio outputs. The computing device 500 may also include a housing 520, constructed of a plastic, metal, or a combination of materials, for containing all or some of the components discussed herein. The computing device 500 may include a power source 522 coupled to the processor 502, such as a disposable or rechargeable battery. The rechargeable battery may also be coupled to the peripheral device connection port to receive a charging current from a source external to the computing device 500. The computing device 500 may also include a physical button 524 for receiving user inputs. The computing device 500 may also include a power button 526 for turning the computing device 500 on and off.

Figure 6:
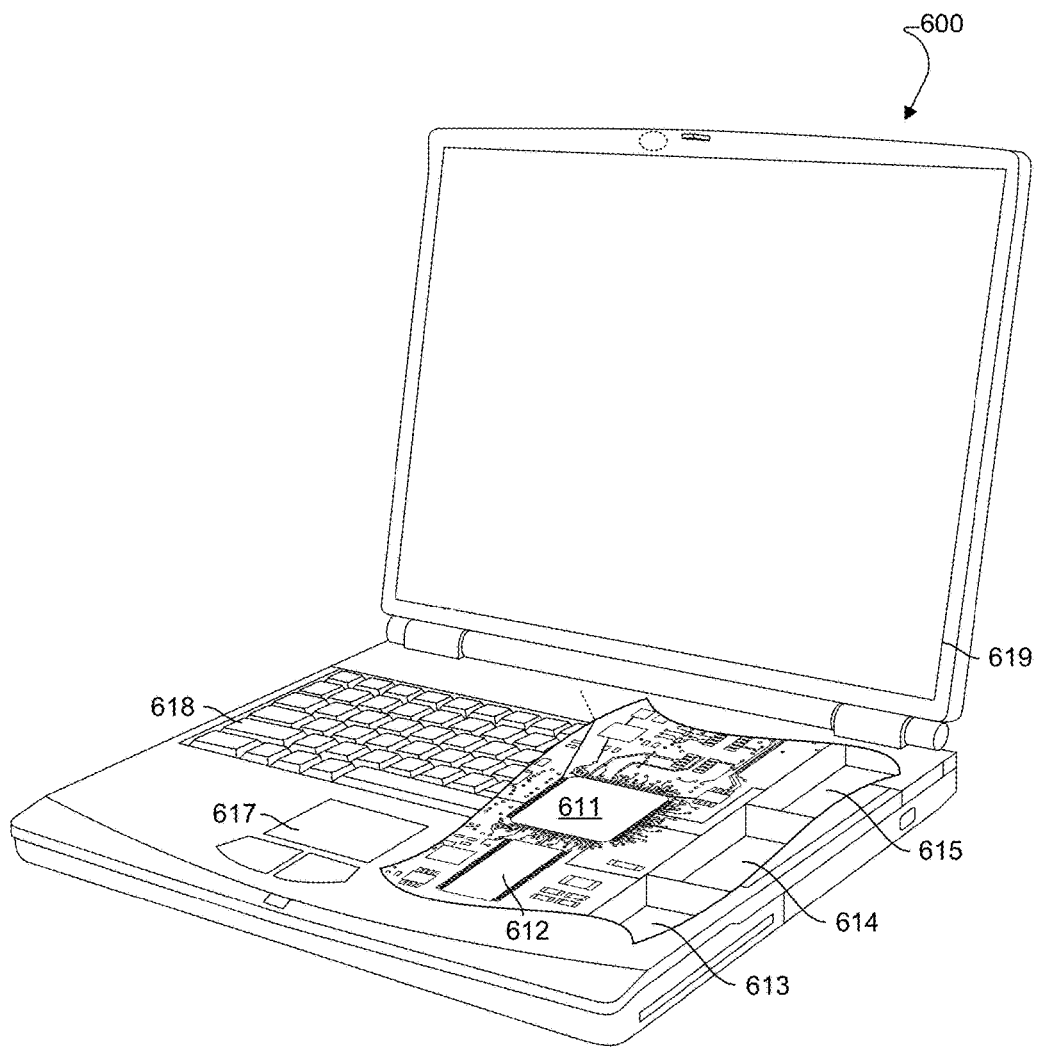
FIG. 6 is a component block diagram of a computing device suitable for implementing some embodiment methods.

Various embodiments, including the embodiments illustrated in FIG. 4, may be implemented in any of a variety of computing devices, an example of which (e.g., computing device 600) is illustrated in FIG. 6. According to various embodiments, the computing device 600 may be similar to the computing device 100 as described with reference to FIG. 1. As such, the computing device 600 may implement the method 400 in FIG. 4.

A computing device 600 (which may correspond, for example, to the computing device 100 in FIG. 1) may include a touchpad touch surface 617 that serves as the pointing device of the computing device 600, and thus may receive drag, scroll, and flick gestures similar to those implemented on wireless devices equipped with a touch screen display and described below. The computing device 600 will typically include a processor 611 coupled to volatile memory 612 and a large capacity nonvolatile memory, such as a disk drive 613 of Flash memory. The computing device 600 may also include a floppy disc drive 614 and a compact disc (CD) drive 615 coupled to the processor 611. The computing device 600 may also include a number of connector ports coupled to the processor 611 for establishing data connections or receiving external memory devices, such as a universal serial bus (USB) or FireWire® connector sockets, or other network connection circuits for coupling the processor 611 to a network. In a notebook configuration, the device housing includes the touchpad 617, the keyboard 618, and the display 619 all coupled to the processor 611. Other configurations of the computing device 600 may include a computer mouse or trackball coupled to the processor (e.g., via a USB input) as are well known, which may also be used in conjunction with various embodiments.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, modules, and circuits described in connection with various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of various embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for analyzing a program executing within a virtual environment on a computing device, comprising:
   determining whether the program is attempting to detect whether the program is being executed within the virtual environment; and
   in response to determining that the program is attempting to detect whether the program is being executed within the virtual environment:
      terminating the program during execution within the virtual environment;
      re-executing the program in a protected mode of the computing device; and
   analyzing the program within the protected mode of the computing device.

2. The method of claim 1, wherein the protected mode is a system management mode.

3. The method of claim 1, further comprising continuing analysis of the program within the virtual environment in response to determining that the program is not attempting to detect whether the program is being executed within the virtual environment.

4. The method of claim 1, wherein determining whether the program is attempting to detect whether the program is being executed within the virtual environment comprises:
   monitoring access of the program to application programming interface (API) properties of the virtual environment.

5. The method of claim 4, wherein the API properties include at least one member selected from the group consisting of a model specific register, a length of an instruction, a store interrupt descriptor table register, a debugger function, and an instruction for host-guest communication.

6. The method of claim 1, wherein the virtual environment comprises a virtual machine or an emulator.

7. A computing device, comprising:
   a hardware processor configured with processor-executable instructions to:
      determine whether a program executing within a virtual environment on the computing device is attempting to detect whether the program is being executed within the virtual environment; and
      in response to determining that the program is attempting to detect whether the program is being executed within the virtual environment:
         terminate the program during execution within the virtual environment;
         re-execute the program in a protected mode of the computing device; and analyze the program within the protected mode of the computing device.

8. The computing device of claim 7, wherein the protected mode is a system management mode.

9. The computing device of claim 7, wherein the hardware processor is further configured with processor-executable instructions to continue analysis of the program within the virtual environment in response to determining that the program is not attempting to detect whether the program is being executed within the virtual environment.

10. The computing device of claim 7, wherein the hardware processor is configured with processor-executable instructions to determine whether the program is attempting to detect whether the program is being executed within the virtual environment by:
monitoring access of the program to application programming interface (API) properties of the virtual environment.

11. The computing device of claim 10, wherein the API properties include at least one member selected from the group consisting of a model specific register, a length of an instruction, a store interrupt descriptor table register, a debugger function, and an instruction for host-guest communication.

12. The computing device of claim 7, wherein the virtual environment comprises a virtual machine or an emulator.

13. A non-transitory computer readable storage medium having stored thereon processor-executable software instructions configured to cause a processor of a computing device to perform operations comprising:
determining whether a program executing within a virtual environment on the computing device is attempting to detect whether the program is being executed within the virtual environment; and
in response to determining that the program is attempting to detect whether the program is being executed within the virtual environment:
terminating the program during execution within the virtual environment;
re-executing the program in a protected mode of the computing device; and
analyzing the program within the protected mode of the computing device.

14. The non-transitory computer readable storage medium of claim 13, wherein the protected mode is a system management mode.

15. The non-transitory computer readable storage medium of claim 13, wherein the stored processor-executable software instructions are configured to cause the processor to perform operations further comprising continuing analysis of the program within the virtual environment in response to determining that the program is not attempting to detect whether the program is being executed within the virtual environment.

16. The non-transitory computer readable storage medium of claim 13, wherein the stored processor-executable software instructions are further configured to cause the processor to perform operations such that determining whether the program is attempting to detect whether the program is being executed within the virtual environment comprises:
monitoring access of the program to application programming interface (API) properties of the virtual environment.

17. The non-transitory computer readable storage medium of claim 16, wherein the API properties include at least one member selected from the group consisting of a model specific register, a length of an instruction, a store interrupt descriptor table register, a debugger function, and an instruction for host-guest communication.

18. The non-transitory computer readable storage medium of claim 13, wherein the virtual environment comprises a virtual machine or an emulator.

19. A computing device, comprising:
means for determining whether a program executing within a virtual environment on the computing device is attempting to detect whether the program is being executed within the virtual environment;
means for terminating the program during execution within the virtual environment in response to determining that the program is attempting to detect whether the program is being executed within the virtual environment;
means for re-executing the program in a protected mode of the computing device in response to determining that the program is attempting to detect whether the program is being executed within the virtual environment; and
means for analyzing the program within the protected mode of the computing device in response to determining that the program is attempting to detect whether the program is being executed within the virtual environment.

20. The computing device of claim 19, wherein the protected mode is a system management mode.

21. The computing device of claim 19, further comprising means for continuing analysis of the program within the virtual environment in response to determining that the program is not attempting to detect whether the program is being executed within the virtual environment.

22. The computing device of claim 19, wherein the means for determining whether the program is attempting to detect whether the program is being executed within the virtual environment comprises:
means for monitoring access of the program to application programming interface (API) properties of the virtual environment.

23. The computing device of claim 22, wherein the API properties include at least one member selected from the group consisting of a model specific register, a length of an instruction, a store interrupt descriptor table register, a debugger function, and an instruction for host-guest communication.

24. The computing device of claim 19, wherein the virtual environment comprises a virtual machine or an emulator.

* * * * *